US010053164B2

(12) United States Patent
Faruque et al.

(10) Patent No.: US 10,053,164 B2
(45) Date of Patent: Aug. 21, 2018

(54) VEHICLE WITH ROUND PASSENGER COMPARTMENT

(71) Applicant: Ford Global Technologies, LLC, Dearborn, MI (US)

(72) Inventors: Mohammed Omar Faruque, Ann Arbor, MI (US); S. M. Iskander Farooq, Novi, MI (US); Dean M. Jaradi, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 31 days.

(21) Appl. No.: 15/286,816

(22) Filed: Oct. 6, 2016

(65) Prior Publication Data

US 2018/0099705 A1 Apr. 12, 2018

(51) Int. Cl.
| | |
|---|---|
| *B62D 47/02* | (2006.01) |
| *B60R 21/16* | (2006.01) |
| *B60N 3/00* | (2006.01) |
| *B60N 2/06* | (2006.01) |
| *B60N 2/14* | (2006.01) |
| *B60N 5/00* | (2006.01) |
| *B60R 21/20* | (2011.01) |

(52) U.S. Cl.
CPC ............... *B62D 47/02* (2013.01); *B60N 2/06* (2013.01); *B60N 2/14* (2013.01); *B60N 3/001* (2013.01); *B60N 5/00* (2013.01); *B60R 21/16* (2013.01); *B60R 21/20* (2013.01); *G05D 2201/0212* (2013.01)

(58) Field of Classification Search
CPC ........ B62D 47/02; B60R 21/16; B60N 3/001; B60N 2/06; B60N 2/14; B60N 5/00; G05D 2201/0212
See application file for complete search history.

(56) References Cited

U.S. PATENT DOCUMENTS

| | | | |
|---|---|---|---|
| 3,325,180 A | * | 6/1967 | Bandini ................. B62D 31/00 180/321 |
| 6,796,398 B1 | | 9/2004 | DeGevay |
| 7,828,383 B1 | | 11/2010 | Urbanek et al. |
| 9,199,553 B2 | | 12/2015 | Cuddihy et al. |

(Continued)

FOREIGN PATENT DOCUMENTS

| | | | |
|---|---|---|---|
| DE | 202013008497 U1 | 12/2013 | |
| EP | 1449709 A1 * | 8/2004 | ............... B60N 2/01 |
| FR | 2933641 A1 | 1/2015 | |

(Continued)

OTHER PUBLICATIONS

Kim, Jeanne, "Mercedes has designed a self-driving car and it's as luxurious as you'd think," Quartz; Jan. 7, 2015.

(Continued)

*Primary Examiner* — D Glenn Dayoan
*Assistant Examiner* — Melissa A Black
(74) *Attorney, Agent, or Firm* — Frank A. MacKenzie; Bejin Bieneman PLC

(57) ABSTRACT

A vehicle includes a wall having a cylindrical shape and surrounding a passenger compartment. The vehicle includes a table in the passenger compartment, a circular track fixed in the compartment and extending around the table, and a plurality of seats mounted to and independently slidable along the track.

20 Claims, 6 Drawing Sheets

(56) References Cited

U.S. PATENT DOCUMENTS

2013/0062133 A1* 3/2013 Budweil ............ B60B 35/1063
180/209
2017/0334313 A1 11/2017 Ahn et al.

FOREIGN PATENT DOCUMENTS

GB    2549598 A   10/2017
JP    2002337619 A   11/2002
WO    9205995 A1   4/1992

OTHER PUBLICATIONS

Search Report from United Kingdom Intellectual Property Office dated Feb. 27, 2018 regarding GB Application 1715643.1 (3 pages).

* cited by examiner

VEHICLE WITH ROUND PASSENGER COMPARTMENT

BACKGROUND

Autonomous vehicles have the ability to operate without the intervention of a human operator, e.g., driver, that is, a vehicle controller makes decisions about accelerating, braking, and/or steering the vehicle. A vehicle may be fully autonomous or semiautonomous. A semiautonomous vehicle is autonomous only in particular situations, for example, highway driving or parallel parking, or with respect to certain vehicle subsystems, for example, braking but not acceleration or steering. A fully autonomous vehicle has a vehicle controller that simultaneously controls each of accelerating, braking, and steering.

Vehicles include passenger compartments to house occupants, if any, of the vehicles. The passenger compartment includes front seats disposed at a front of the passenger compartment and rear seats disposed behind the front seats. The front seats are either two buckets seats or a bench seat holding up to two or three occupants. The rear seats are also either two buckets seats or a bench seat holding up to two or three occupants. The passenger compartments of some vehicles also include third-row seats at a rear of the passenger compartment. The front seats, rear seats, and third-row seats all face in a vehicle-forward direction.

DETAILED DESCRIPTION

Figure 1:
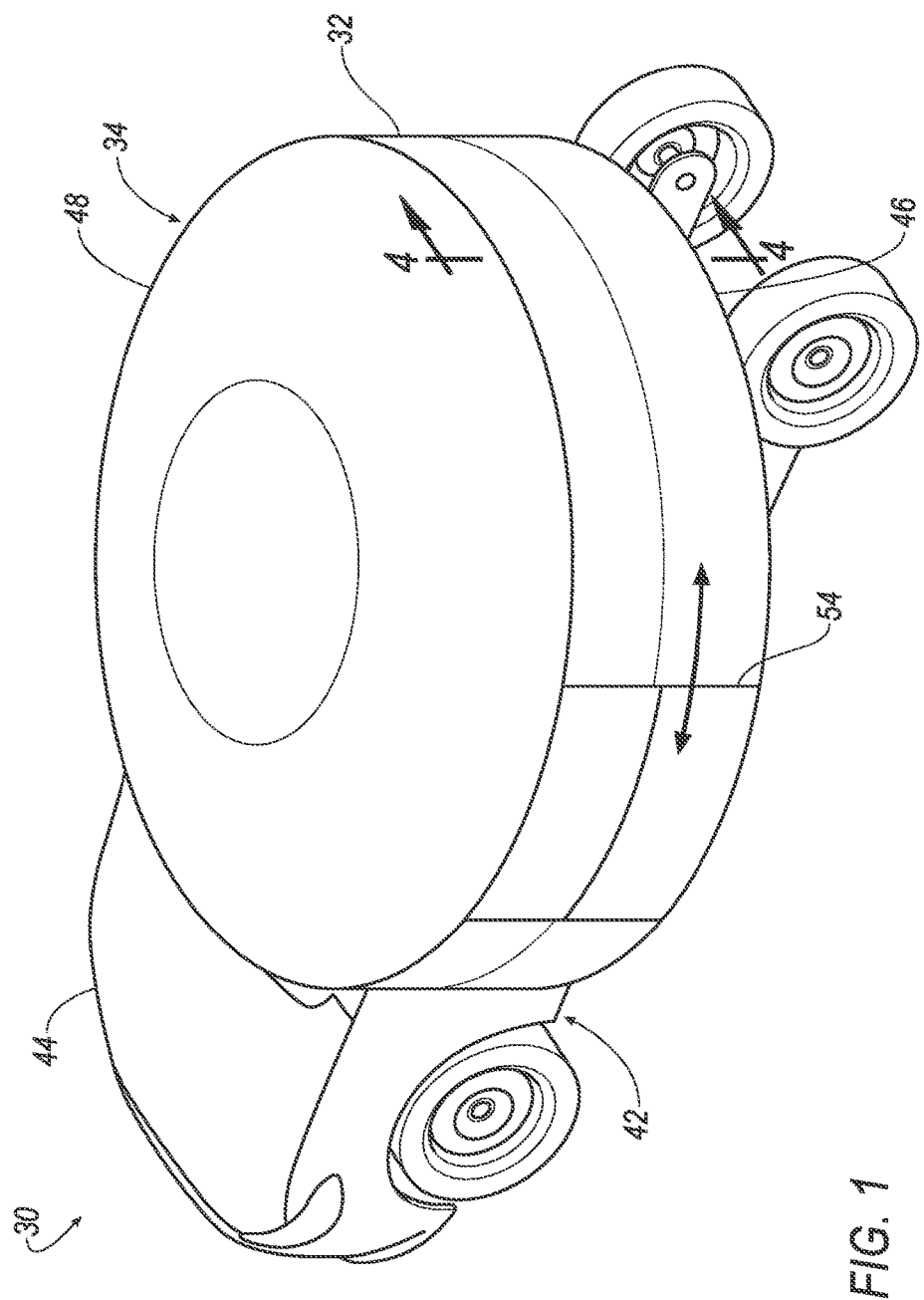
FIG. 1 is a perspective view of a vehicle.

With reference to the Figures, wherein like numerals indicate like parts throughout the several views, a vehicle 30 includes a wall 32 having a cylindrical shape and surrounding a passenger compartment 34. The vehicle 30 includes a table 36 in the passenger compartment 34, a circular track 38 fixed in the compartment 34 and extending around the table 36, and a plurality of seats 40 mounted to and independently slidable along the track 38.

The vehicle 30 provides a versatile passenger compartment 34 that may be used, e.g., when the vehicle 30 is autonomously operated. The table 36 provides an area for occupants to collaboratively work or play. The passenger compartment 34 provides a spacious interior space for occupants to use. Occupants may increase free space by moving and/or stowing the seats 40, as discussed further below. In some configurations, the passenger compartment 34 may open to the external environment, providing a variety of surroundings for occupants.

The vehicle 30 may be an autonomous vehicle. A vehicle controller (not shown), sometimes referred to as the "virtual driver," may be capable of operating the vehicle 30 independently of the intervention of a human driver, to a greater or a lesser degree. The vehicle controller may be programmed to operate an engine, braking system, steering, and/or other vehicle systems.

With reference to FIGS. 1-3 and 7-8, the vehicle 30 includes a frame 42. The frame 42 may be of a unibody construction, a body-on-frame construction, or of any other suitable construction. The frame 42 may be formed of any suitable material, for example, steel, aluminum, etc. The frame 42 may include a front end 44 housing an engine (not shown) and a base 46 supporting the passenger compartment 34.

The vehicle 30 includes a passenger compartment 34 to house occupants, if any, of the vehicle 30. The passenger compartment 34 is enclosed by the wall 32, a roof 48, and a floor 50. The passenger compartment 34 may be supported by the base 46.

The base 46 is part of the frame 42. The base 46 may support the passenger compartment 34. Specifically, the base 46 may support the floor 50, and the base 46 may support the wall 32.

The floor 50 is supported on the frame 42, specifically on the base 46. The floor 50 may support the wall 32, the table 36, and the seats 40. The floor 50 may be rotatable relative to the frame 42. For example, the floor 50 may rotate on the base 46. Rotation of the floor 50 may be powered by, e.g., an electric motor. The base 46 and/or the floor 50 may include tracks (not shown) for guiding rotation of the floor 50 relative to the base 46. Rotating the floor 50 may correspondingly rotate the seats 40, the table 36, the wall 32, and/or the roof 48 relative to the frame 42. For example, the floor 50, the table 36, and the seats 40 may all rotate together relative to and within the wall 32 and the roof 48. For another example, the floor 50 and the seats 40 may rotate together relative to and about the table 36. For a third example, the floor 50, the table 36, the seats 40, the wall 32, and the roof 48 may all rotate together relative to the frame 42 and the front end 44.

Figure 3:
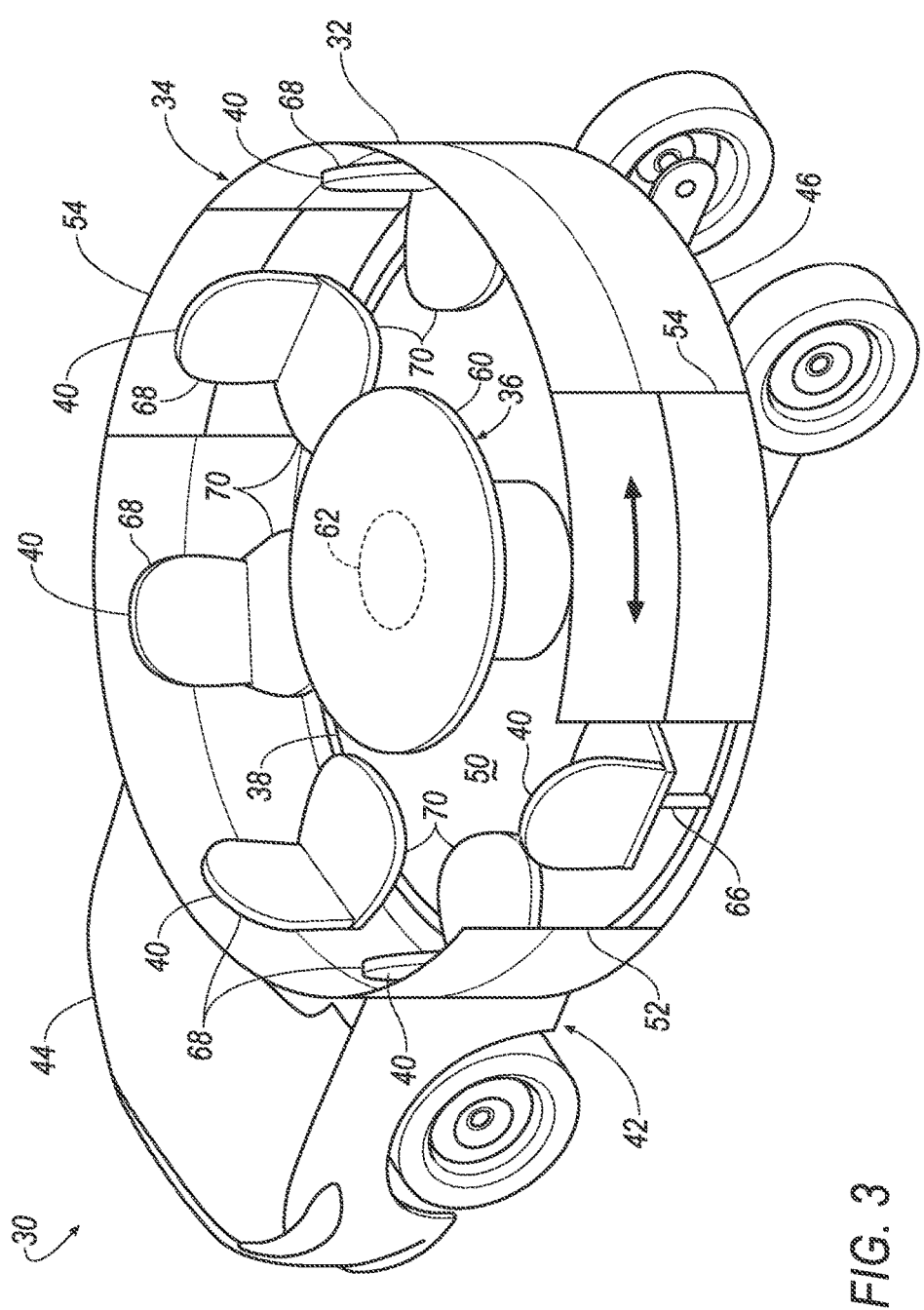
FIG. 3 is a perspective view of the vehicle with the roof removed and the door in an open position.

The wall 32 may be supported by the base 46 and/or the floor 50. The wall 32 has a cylindrical shape and surrounds the passenger compartment 34. The wall 32 may support the roof 48. The wall 32 may have gaps 52 for one or more doors 54, as shown in FIG. 3.

Figure 7:
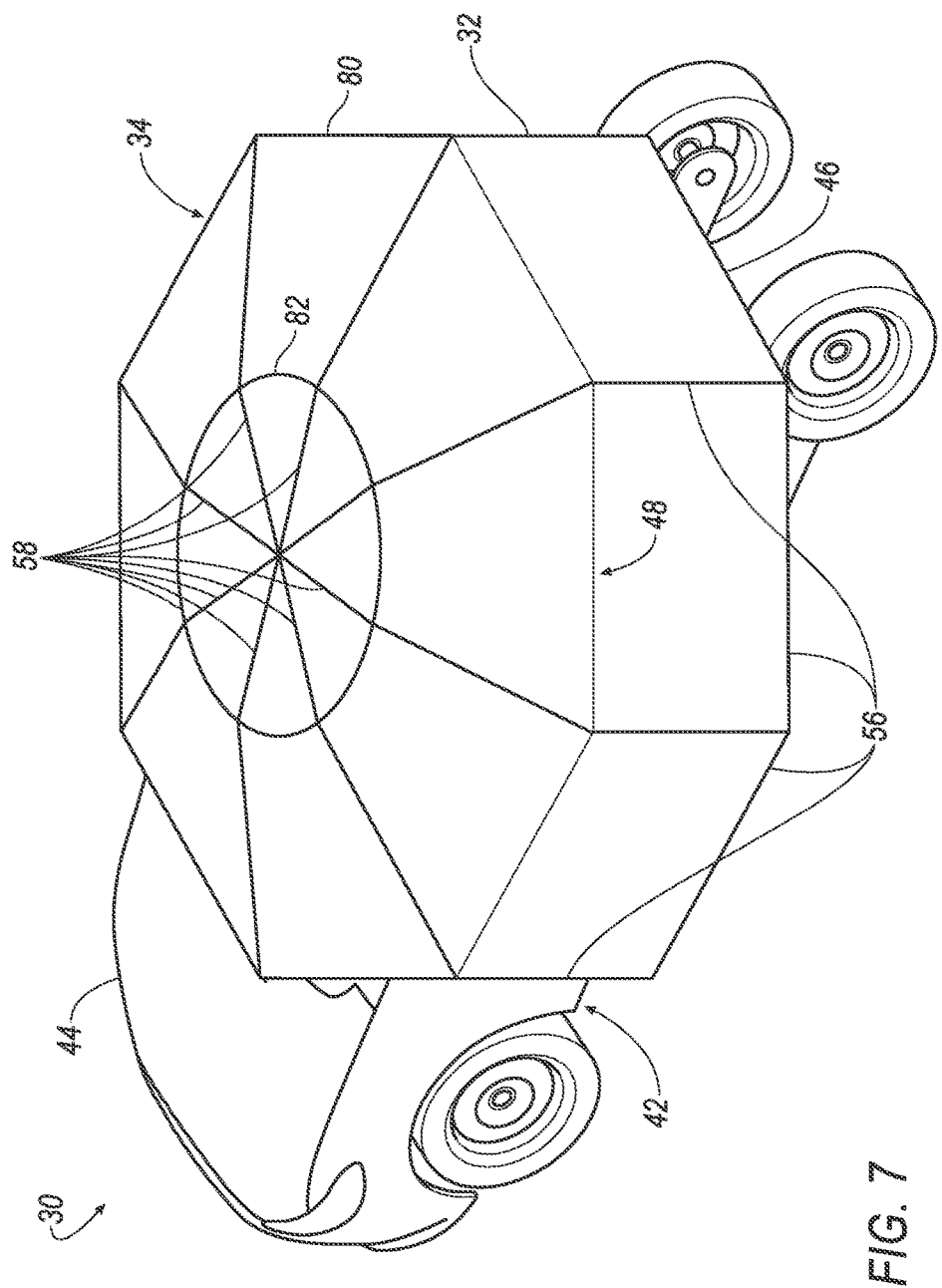
FIG. 7 is a perspective view of another embodiment of the vehicle with a passenger compartment in a closed state.
Figure 8:
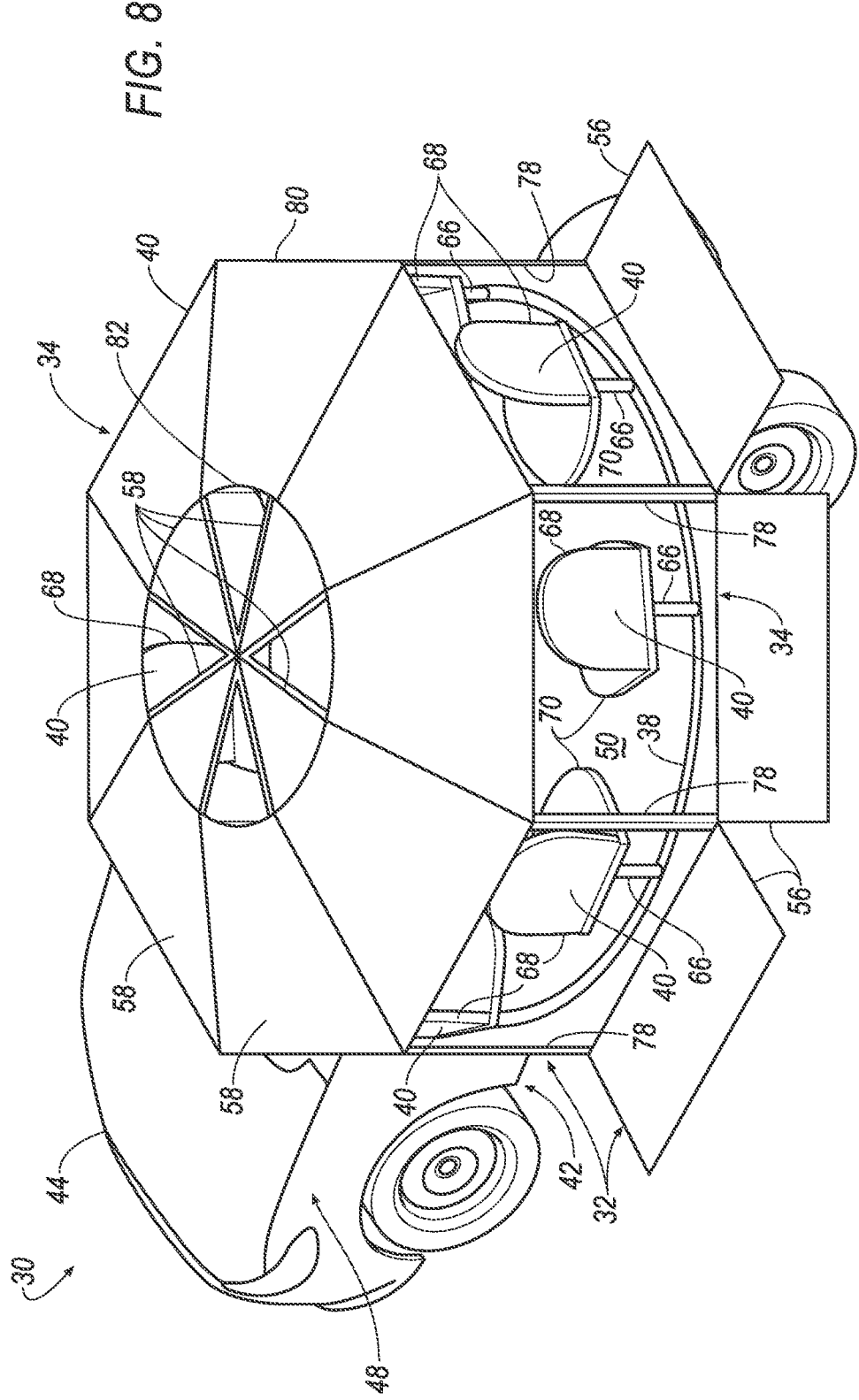
FIG. 8 is a perspective view of another embodiment of the vehicle with the passenger compartment in an open state.

With reference to FIGS. 7-8, the wall 32 may include a plurality of wall segments 56 arranged circumferentially about the passenger compartment 34. The wall segments 56 may be rotatable radially outward relative to the base 46, as shown in FIG. 8. The wall segments 56 may fold down away from the passenger compartment 34. The wall segments 56 may be movable from an upright position adjoining each other, as shown in FIG. 7, to an unfolded position extending radially away from the base 46, as shown in FIG. 8. The wall segments 56 may be movable together or independently. The wall segments 56 may include any suitable interlocking features, seals, etc. (not shown), for interlocking to each other in the upright position. One or more of the wall segments 56 may include one or more entries (not shown), e.g., doors 54, allowing ingress and egress to the passenger compartment 34 when the wall segments 56 are in the upright position.

Between each pair of wall segments 56 is a support beam 78. The support beams are components of the frame 42. The support beams 78 may provide support for the roof 48 and may provide structural rigidity for the vehicle 30. When the wall segments 56 are in the upright position, as shown in FIG. 7, the wall segments 56 may cover the support beams 78 or may reveal the support beams 78.

With reference to FIGS. 1-3 and 7-8, the roof 48 may be supported by the wall 32. The roof 48 may have a dome shape, i.e., rounded such as a partial sphere, a truncated partial sphere, etc. The roof 48 may extend over the table 36 and the plurality of seats 40. The roof 48 may be transparent. For example, the roof 48 may be formed of glass.

With reference to FIGS. 7-8, the roof 48 may include a lower roof portion 80 and an upper roof portion 82. The lower roof portion 80 may be supported by the support beams 78. The upper roof portion 82 may be located concentrically in a center of the lower roof portion 80. The upper roof portion 82 may include a plurality of roof segments 58. The roof segments 58 may each be shaped like a circle sector, that is, pie shaped. Some of the roof segments 58 may open and close by rotating about a center of the roof 48 underneath or above other roof segments 58, as shown in FIG. 8.

Figure 2:
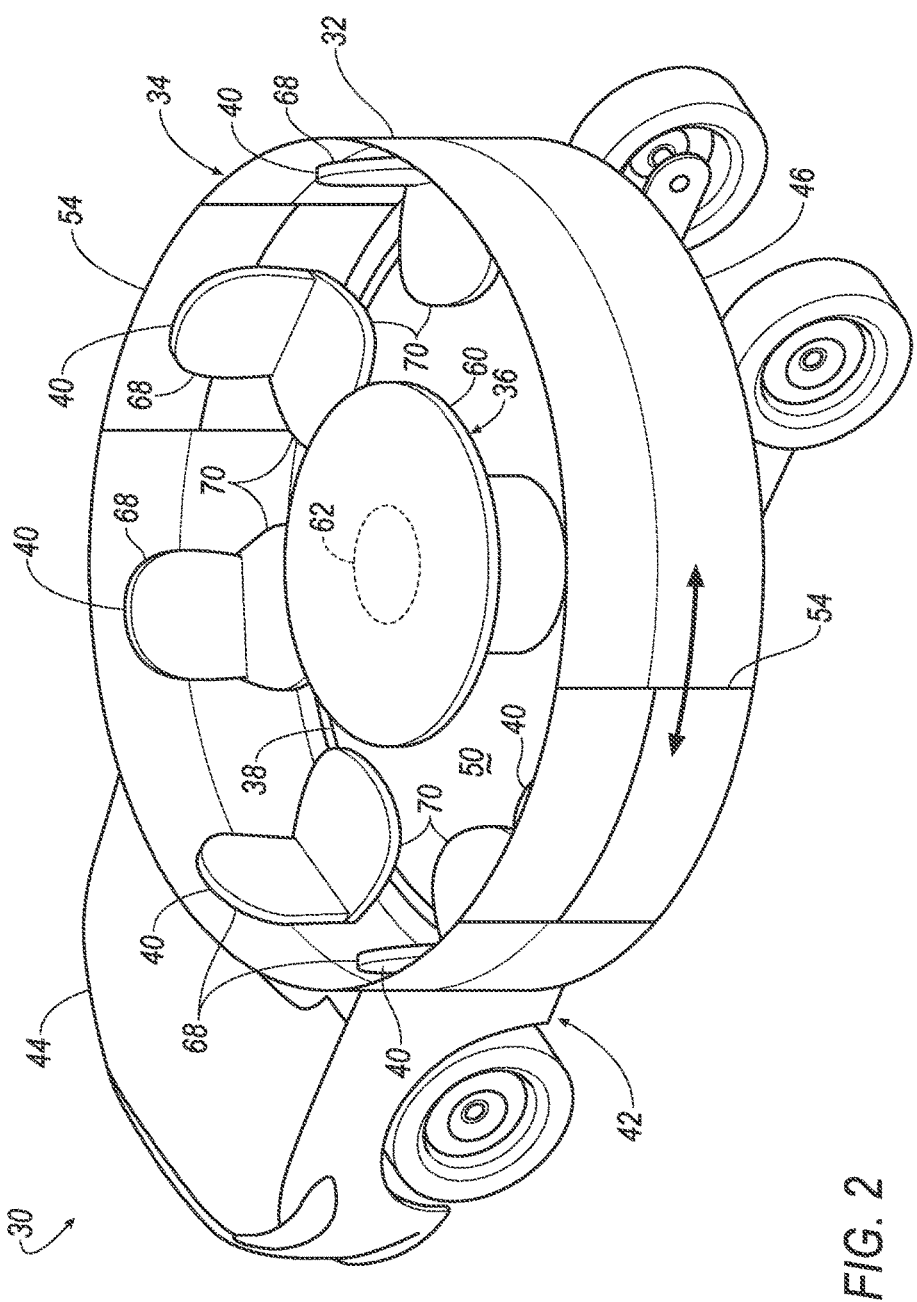
FIG. 2 is a perspective view of the vehicle with a roof removed and a door in a closed position.

With reference to FIGS. 1-3, the wall 32 may include one or more doors 54. The door 54 may have a curved shape corresponding to the cylindrical shape of the wall 32. The door 54 may be slidable along an exterior of the wall 32, as identified with an arrow in FIGS. 1-3. The door 54 may be circumferentially movable between a closed position covering a gap 52 in the wall 32, as shown in FIGS. 1 and 2, and an open position revealing the gap 52 in the wall 32, as shown in FIG. 3. Alternatively, the door 54 may open in another manner such as sliding upward, swinging outward about a vertical axis, swinging downward about a horizontal axis to form a ramp, etc. The door 54 and/or the wall 32 may include any suitable track, guiding system, etc., for guiding movement of the door 54 relative to the wall 32 between the open position and the closed position.

With reference to FIGS. 2,3, and 8, the table 36 may be disposed in the passenger compartment 34. The table 36 may be circular and may be centered within the passenger compartment 34. In other words, the table 36 may form a concentric circle with the wall 32. The table 36 may be sized so that an occupant in any of the seats 40 can reach and use a tabletop 60 of the table 36. The table 36 may be retractable toward the floor 50 in order to provide more space to occupants. The table 36 may be movable from a raised position in which the tabletop 60 is spaced from the floor 50 to a lowered position in which the tabletop 60 touches the floor 50.

An airbag 62 may be supported by the table 36. Specifically, the airbag 62 may be stored at a center of the table 36. The airbag 62 may be inflatable from an undeployed state to a deployed state. The airbag 62 in the undeployed state is stored within the table 36 or under the tabletop 60 of the table 36. The airbag 62 in the deployed state extends upward from the tabletop 60. The airbag 62 in the deployed state may extend radially outward from the table 36 toward occupants, if any.

The airbag 62 may be formed of any suitable airbag material, for example, a woven polymer. For example, the airbag 62 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

Figure 5:
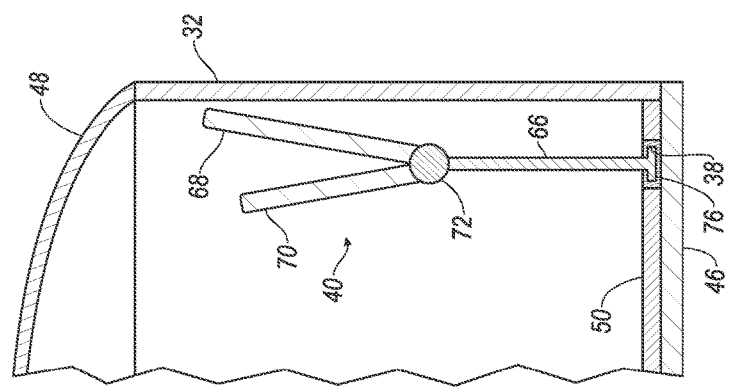
FIG. 5 is a cross-section of the vehicle including the seat with the seat bottom in an upright position along line 4 of FIG. 1.
Figure 4:
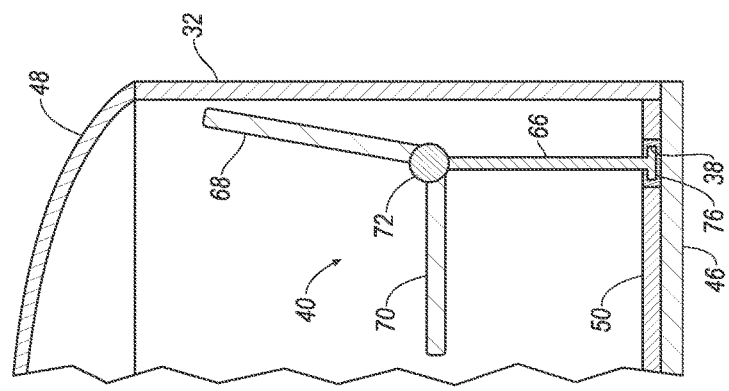
FIG. 4 is a cross-section of the vehicle including a seat with a seat bottom in a sitting position along line 4 of FIG. 1.

With reference to FIGS. 2-6 and 8, as one example, the circular track 38 may be fixed in the passenger compartment 34 and may extend around the table 36. The floor 50 may support the track 38, as shown in FIGS. 4 and 5. The track 38 may be recessed into the floor 50, as shown in FIGS. 4 and 5, or the track 38 may extend upward from the floor 50. The track 38 may form a concentric circle with the wall 32 and/or with the table 36.

Figure 6:
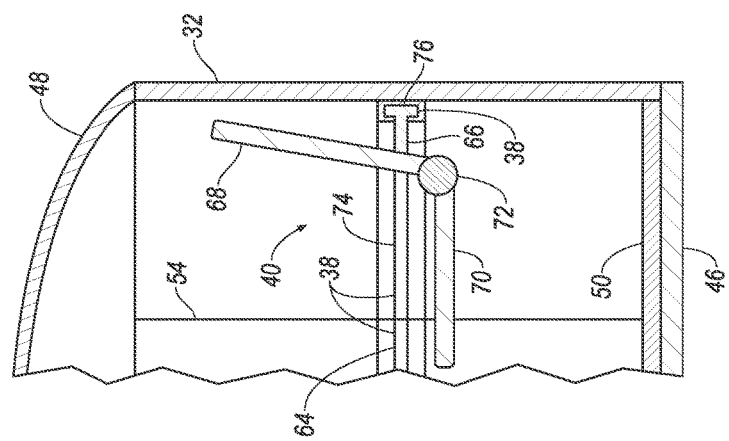
FIG. 6 is a side view of the vehicle including another embodiment of the seat along line 4 of FIG. 1.

As another example, the track 38 may be supported on the wall 32, as shown in FIG. 6. The track 38 may include a wall track segment 74 and a door track segment 64. The wall 32 may support the wall track segment 74 and the door 54 may support the door track segment 64. When the door 54 is in the closed position, the door track segment 64 may align with the wall track segment 74, and any gap between the wall track segment 74 and the door track segment 64 may be short enough that the seats 40 may slide over the gap between the track 38 and the door track segment 64.

With reference to FIGS. 4-6, the plurality of seats 40 may be mounted to and independently slidable along the track 38. If the track 38 is supported on the wall 32, each seat 40 may be slidable along the track 38 onto and off of the door track segment 64. Each seat 40 may be adjacent the wall 32, that is, nothing is positioned between each seat 40 and the wall 32. Each seat 40 may include a pedestal 66, a seatback 68, and a seat bottom 70.

Each seat 40 includes the pedestal 66. The pedestal 66 is mounted to and slidable along the track 38. The pedestal 66 may include a head 76 slidably engaged with the track 38. The head 76 and the track 38 may have any shape and, for example, may be corresponding shapes, to encourage slidable engagement between the pedestal 66 and the track 38. The pedestal 66 may extend from the track 38 to the seat bottom 70 or to a hinge 72 between the seat bottom 70 and the seatback 68. The seat 40 is rotatable about the pedestal 66.

Each seat 40 has the seatback 68. The seatback 68 may provide support for a back of an occupant seated in the seat 40. The seatback 68 may extend generally vertical relative to the passenger compartment 34; for example, the seatback 68 may recline approximately 17° from vertical relative to the passenger compartment 34.

Each seat 40 has the seat bottom 70. The seat bottom 70 is rotatable relative to the seatback 68 between a sitting position and an upright position. In the sitting position, as shown in FIGS. 4 and 6, the seat bottom 70 is generally horizontal relative to the passenger compartment 34. In the upright position, as shown in FIG. 5, the seat bottom 70 is generally vertical relative to the passenger compartment 34. The seat bottom 70 may be rotatable relative to the hinge 72. The hinge 72 may include a spring (not shown) biasing the seat bottom 70 to the upright position.

With reference to FIGS. 7-8, in the configuration in which the wall 32 includes the wall segments 56 and the roof 48 includes the lower and upper roof portions 80, 82, then the passenger compartment 34 may be transformable between a closed state and an open state. In the closed state, shown in FIG. 7, the wall segments 56 adjoin each other in the upright position to form the wall 32 in a cylinder shape, and the roof segments 58 are arranged to close the upper roof portion 82. In the open state, as shown in FIG. 8, the wall segments 56 are splayed radially outward from the passenger compartment 34 in the unfolded position, and the roof segments 58 may be arranged to open one or more sections of the upper roof portion 82. To transition the passenger compartment 34 from the closed state to the open state, the wall segments 56 may rotate radially outward and downward relative to the base 46, and the roof segments 58 may rotate about the center of the upper roof portion 82. To transition the passenger compartment 34 from the open state to the closed state, the wall segments 56 may rotate radially inward until the wall segments 56 adjoin each other, and the roof segments 58 rotate in an opposite direction about the center of the upper roof portion 82.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
   a wall having a cylindrical shape and surrounding a passenger compartment;
   a table in the passenger compartment;
   a circular track fixed in the compartment and extending around the table;
   a plurality of seats mounted to and independently slidable along the track; and
   a door slidable along an exterior of the wall.

2. The vehicle of claim 1, further comprising a roof having a dome shape and being supported by the wall over the table and plurality of seats.

3. The vehicle of claim 2, wherein the roof is transparent.

4. The vehicle of claim 1, further comprising a base supporting the wall, wherein the wall includes a plurality of wall segments arranged circumferentially about the passenger compartment, and wherein the wall segments are rotatable radially outward relative to the base.

5. The vehicle of claim 1, wherein the door has a curved shape corresponding to the cylindrical shape of the wall.

6. The vehicle of claim 1, wherein each seat has a seat bottom rotatable between a sitting position that is generally horizontal relative to the passenger compartment and an upright position that is generally vertical relative to the passenger compartment.

7. The vehicle of claim 1, wherein each seat has a seat bottom and a seatback, wherein the seat bottom is rotatable relative to the seatback between a sitting position and an upright position.

8. The vehicle of claim 7, wherein each seat is adjacent the wall.

9. The vehicle of claim 1, wherein each seat includes a pedestal mounted to and slidable along the track.

10. The vehicle of claim 9, further comprising a floor supporting the track.

11. The vehicle of claim 9, wherein each seat is rotatable about the pedestal.

12. The vehicle of claim 1, wherein the track is supported on the wall.

13. The vehicle of claim 12, wherein the wall includes a door, the track includes a door track segment, and the door supports the door track segment.

14. The vehicle of claim 13, wherein each seat is slidable along the track onto and off of the door track segment.

15. The vehicle of claim 1, further comprising a vehicle frame, and a floor supported on the vehicle frame, wherein the floor supports the wall and is rotatable relative to the frame.

16. The vehicle of claim 1, further comprising an airbag supported by the table.

17. A vehicle comprising:
    a wall having a cylindrical shape and surrounding a passenger compartment;
    a table in the passenger compartment;
    a circular track fixed in the compartment and extending around the table;
    a plurality of seats mounted to and independently slidable along the track; and
    a base supporting the wall;
    wherein the wall includes a plurality of wall segments arranged circumferentially about the passenger compartment; and
    the wall segments are rotatable radially outward and downward relative to the base.

18. A vehicle comprising:
    a wall having a cylindrical shape and surrounding a passenger compartment;
    a table in the passenger compartment;
    a circular track fixed in the compartment and extending around the table;
    a plurality of seats mounted to and independently slidable along the track;
    a vehicle frame; and
    a floor supported on the vehicle frame;
    wherein the floor supports the wall and is rotatable relative to the frame.

19. The vehicle of claim 18, further comprising a door slidable along an exterior of the wall.

20. The vehicle of claim 18, wherein the track is supported on the wall.

* * * * *